United States Patent
Sohara et al.

(10) Patent No.: US 9,141,104 B2
(45) Date of Patent: Sep. 22, 2015

(54) APPARATUS EQUIPPED WITH MOTOR

(75) Inventors: Yoshitsugu Sohara, Tokyo (JP); Shin Genta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 13/095,648

(22) Filed: Apr. 27, 2011

(65) Prior Publication Data

US 2011/0279077 A1 Nov. 17, 2011

(30) Foreign Application Priority Data

May 11, 2010 (JP) .................................. 2010-109123

(51) Int. Cl.
*H02P 6/00* (2006.01)
*H02P 6/14* (2006.01)
*G05B 19/404* (2006.01)
*B41J 19/20* (2006.01)
*G05B 19/23* (2006.01)

(52) U.S. Cl.
CPC ............. *G05B 19/404* (2013.01); *B41J 19/202* (2013.01); *G05B 19/232* (2013.01); *G05B 2219/41175* (2013.01); *G05B 2219/45187* (2013.01)

(58) Field of Classification Search
CPC .............................. B41J 19/202; G05B 19/232
USPC ............... 318/400.01, 400.38, 400.39, 400.4, 318/135, 603, 687
See application file for complete search history.

(56) References Cited

U.S. PATENT DOCUMENTS

| 4,490,796 | A | * | 12/1984 | Bigbie et al. | 358/1.14 |
| 4,882,511 | A | | 11/1989 | Von Der Heide | |
| 5,264,769 | A | * | 11/1993 | Itoh | 318/685 |
| 5,270,631 | A | * | 12/1993 | Takahashi et al. | 318/135 |
| 6,528,962 | B1 | * | 3/2003 | Igarashi et al. | 318/461 |
| 7,019,481 | B2 | * | 3/2006 | Kato et al. | 318/610 |
| 7,274,163 | B1 | * | 9/2007 | Lambert et al. | 318/400.12 |
| 2003/0043228 | A1 | * | 3/2003 | Igarashi | 347/37 |

FOREIGN PATENT DOCUMENTS

| JP | H01-194898 A | 8/1989 |
| JP | H06-122242 A | 5/1994 |
| JP | 2002-199774 A | 7/2002 |
| JP | 2002-248827 A | 9/2002 |

* cited by examiner

*Primary Examiner* — Erick Glass
(74) *Attorney, Agent, or Firm* — Canon USA, Inc. IP Division

(57) ABSTRACT

An apparatus includes a driven member, a DC brushless motor, a first signal generation unit configured to output a first signal according to rotation of the DC brushless motor and to change an output value of the first signal each time the DC brushless motor rotates by a predetermined amount, a movement unit configured to move the driven member by a driving force of the DC brushless motor, a second signal generation unit configured to output a second signal each time the driven member moves by the predetermined amount, and a control unit configured to control driving of the DC brushless motor based on the output value of the first signal and a value of a number of times that the second signal is output during a period in which the DC brushless motor rotates by a predetermined amount.

6 Claims, 16 Drawing Sheets

FIG.2A U-PHASE COIL COUNTER ELECTROMOTIVE VOLTAGE WAVEFORM (BETWEEN U-PHASE COMMON TERMINALS)
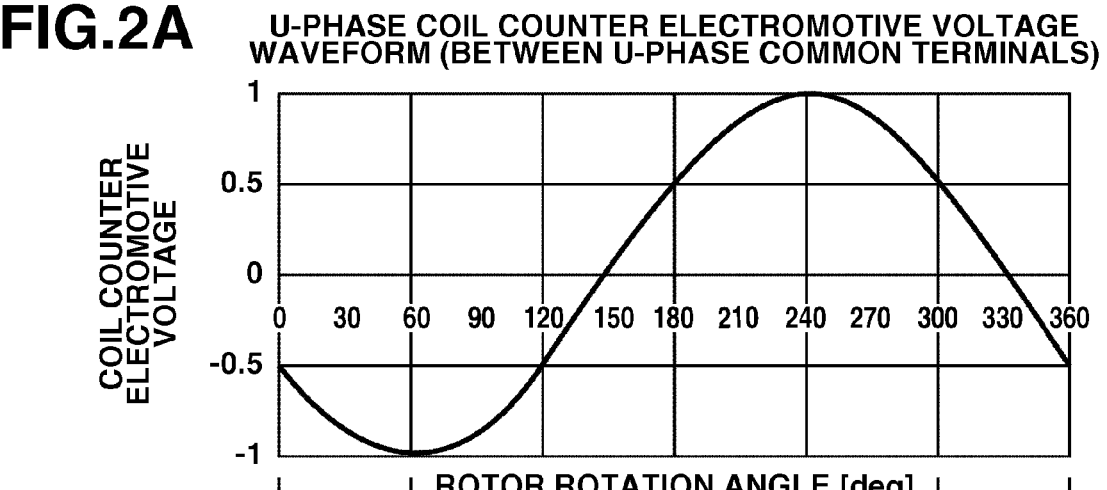
FIG.2B U-PHASE COIL ENERGIZATION VOLTAGE WAVEFORM
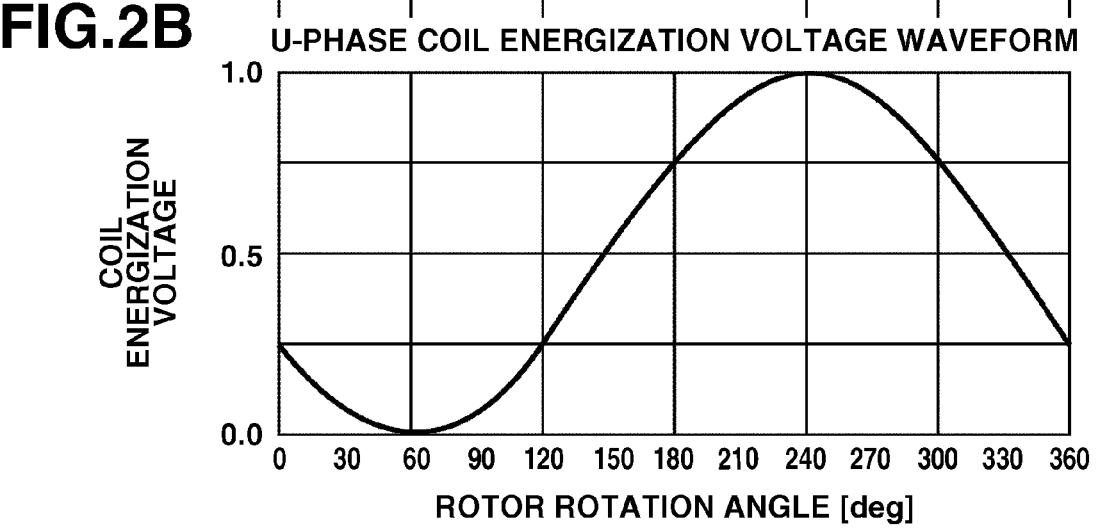

FIG.3A U-PHASE COIL COUNTER ELECTROMOTIVE VOLTAGE WAVEFORM (BETWEEN U-PHASE COMMON TERMINALS)
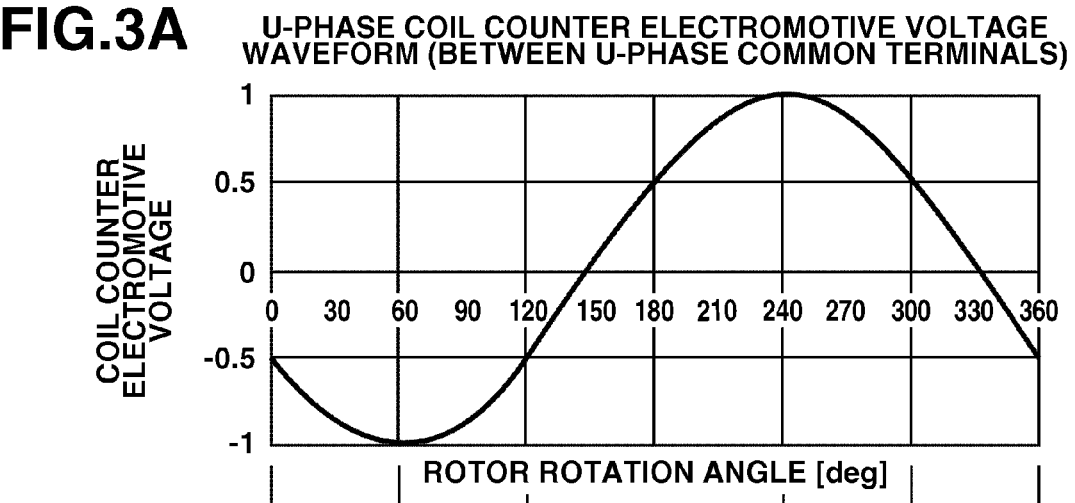
FIG.3B U-PHASE COIL ENERGIZATION VOLTAGE WAVEFORM
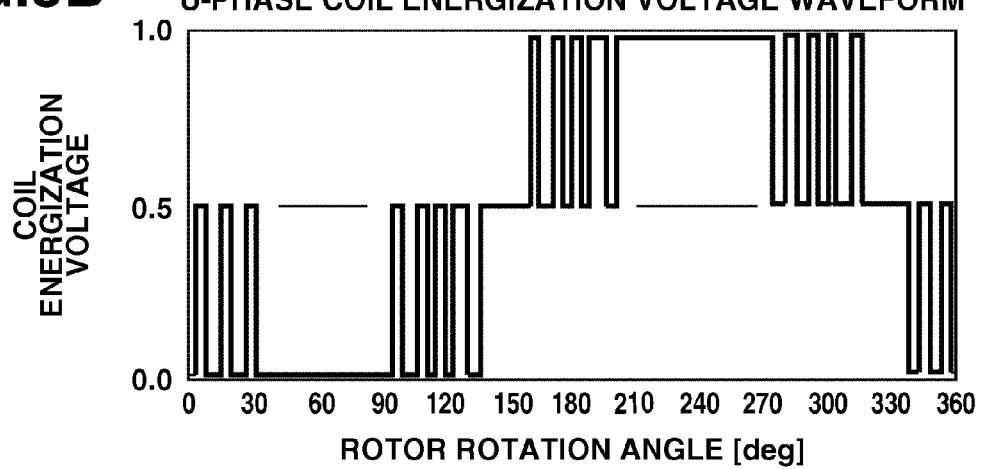

FIG.4A
U-PHASE COIL COUNTER ELECTROMOTIVE VOLTAGE WAVEFORM (BETWEEN U-PHASE COMMON TERMINALS)
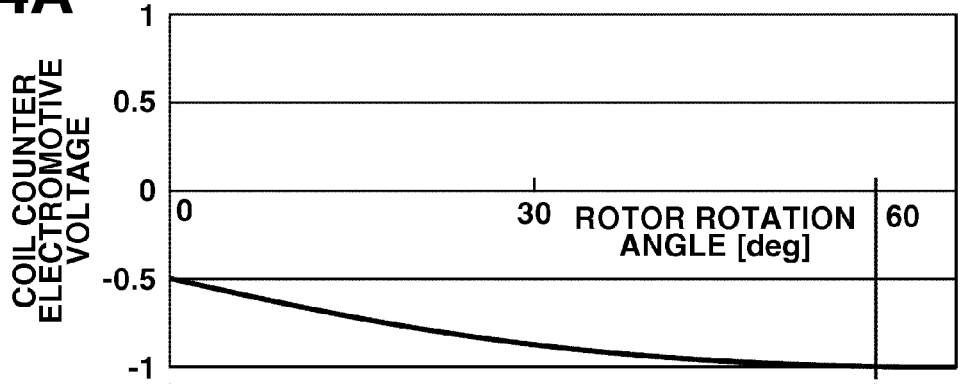
FIG.4B
HALL ELEMENT OUTPUT AND LINEAR ENCODER COUNTER VALUE
| HALL OUTPUT U | H | | | | | | | | | | | | | | | | | | H | |
|---|---|---|---|---|---|---|---|---|---|---|---|---|---|---|---|---|---|---|---|---|
| HALL OUTPUT V | L | | | | | | | | | | | | | | | | | | L | |
| HALL OUTPUT W | H | | | | | | | | | | | | | | | | | | L | |
| LINEAR ENCODER PULSE NUMBER | 1 | 2 | 3 | 4 | 5 | 6 | 7 | 8 | 9 | 10 | 11 | 12 | 13 | 14 | 15 | 16 | 17 | 18 | 1 | 2 |
FIG.4C
LINEAR ENCODER PULSE OUTPUT
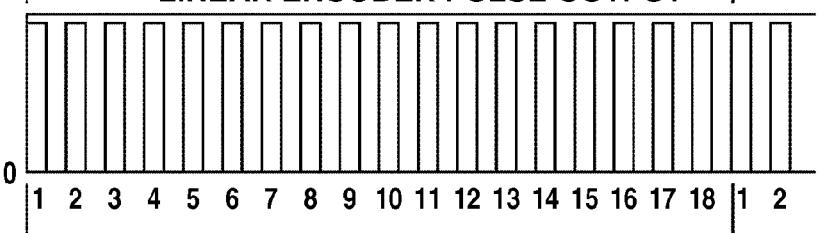
FIG.4D
COIL ENERGIZATION TABLE
| COIL U OUTPUT | 0.5 | 0.0 | 0.0 | 0.5 | 0.0 | 0.0 | 0.5 | 0.0 | 0.0 | 0.0 | 0.0 | 0.0 | 0.0 | 0.0 | 0.0 | 0.0 | 0.0 | 0.0 | 0.0 | 0.0 |
| COIL V OUTPUT | 1.0 | 1.0 | 1.0 | 1.0 | 1.0 | 1.0 | 1.0 | 1.0 | 1.0 | 1.0 | 1.0 | 0.5 | 1.0 | 1.0 | 0.5 | 1.0 | 1.0 | 0.5 | 1.0 | 0.5 |
| COIL W OUTPUT | 0.0 | 0.5 | 0.5 | 0.0 | 0.5 | 0.5 | 0.0 | 0.5 | 0.5 | 0.5 | 0.5 | 1.0 | 0.5 | 0.5 | 1.0 | 0.5 | 0.5 | 1.0 | 0.5 | 1.0 |
FIG.4E
U-PHASE COIL ENERGIZATION VOLTAGE WAVEFORM
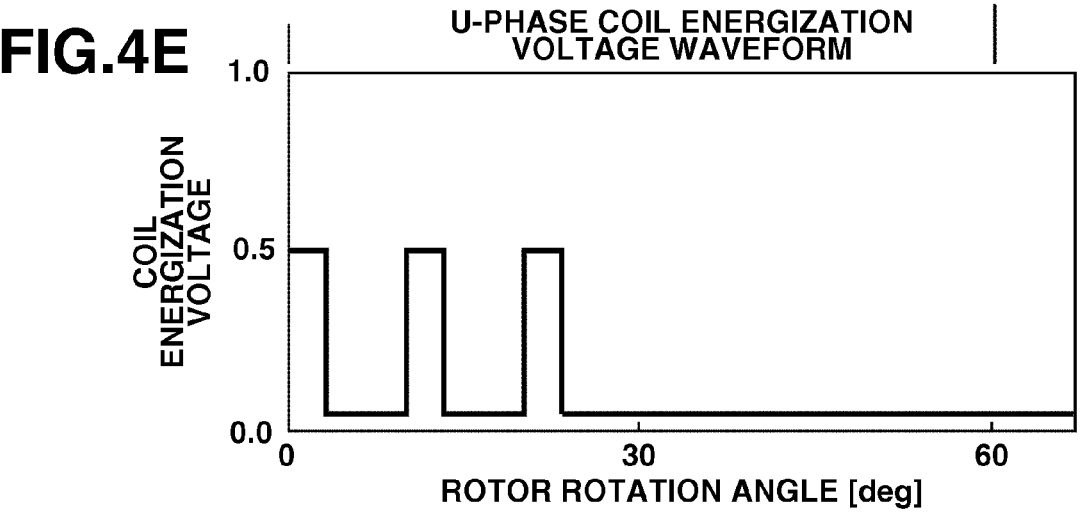

FIG.6

| HALL ELEMENT OUTPUT | | | LINEAR ENCODER PULSE COUNT VALUE | COIL TERMINAL OUTPUT VOLTAGE | | |
|---|---|---|---|---|---|---|
| u | v | w | | U | V | W |
| H | L | H | 1 | 0.5 | 1 | 0 |
| H | L | H | 2 | 0 | 1 | 0.5 |
| H | L | H | 3 | 0 | 1 | 0.5 |
| H | L | H | 4 | 0.5 | 1 | 0 |
| H | L | H | 5 | 0 | 1 | 0.5 |
| H | L | H | 6 | 0 | 1 | 0.5 |
| H | L | H | 7 | 0.5 | 1 | 0 |
| H | L | H | 8 | 0 | 1 | 0.5 |
| H | L | H | 9 | 0 | 1 | 0.5 |
| H | L | H | 10 | 0 | 1 | 0.5 |
| H | L | H | 11 | 0 | 1 | 0.5 |
| H | L | H | 12 | 0 | 0.5 | 1 |
| H | L | H | 13 | 0 | 1 | 0.5 |
| H | L | H | 14 | 0 | 1 | 0.5 |
| H | L | H | 15 | 0 | 0.5 | 1 |
| H | L | H | 16 | 0 | 1 | 0.5 |
| H | L | H | 17 | 0 | 1 | 0.5 |
| H | L | H | 18 | 0 | 0.5 | 1 |
| H | L | L | 1 | 0 | 1 | 0.5 |
| H | L | L | 2 | 0 | 0.5 | 1 |
| H | L | L | 3 | 0 | 0.5 | 1 |

FIG.7

TIME SERIES CHANGE RESULTS

| HALL ELEMENT OUTPUT | | | LINEAR ENCODER PULSE COUNT VALUE | COIL TERMINAL OUTPUT VOLTAGE | | |
|---|---|---|---|---|---|---|
| u | v | w | | U | V | W |
| H | L | H | 1 | 0.5 | 1 | 0 |
| H | L | H | 2 | 0 | 1 | 0.5 |
| H | L | H | 3 | 0 | 1 | 0.5 |
| H | L | H | 4 | 0.5 | 1 | 0 |
| H | L | H | 5 | 0 | 1 | 0.5 |
| H | L | H | 6 | 0 | 1 | 0.5 |
| H | L | H | 7 | 0.5 | 1 | 0 |
| H | L | H | 8 | 0 | 1 | 0.5 |
| H | L | H | 9 | 0 | 1 | 0.5 |
| H | L | H | 10 | 0 | 1 | 0.5 |
| H | L | H | 11 | 0 | 1 | 0.5 |
| H | L | H | 12 | 0 | 0.5 | 1 |
| H | L | H | 13 | 0 | 1 | 0.5 |
| H | L | H | 14 | 0 | 1 | 0.5 |
| H | L | H | 15 | 0 | 0.5 | 1 |
| H | L | H | 16 | 0 | 1 | 0.5 |
| H | L | H | 17 | 0 | 1 | 0.5 |
| H | L | H | 18 | 0 | 0.5 | 1 |
| H | L | H | (19) BY SUBSTITUTION OF 18 | 0 | 0.5 | 1 |
| H | L | H | (20) BY SUBSTITUTION OF 18 | 0 | 0.5 | 1 |
| H | L | L | 1 | 0 | 1 | 0.5 |
| H | L | L | 2 | 0 | 0.5 | 1 |
| H | L | L | 3 | 0 | 0.5 | 1 |

FIG.8

TIME SERIES CHANGE RESULTS

| HALL ELEMENT OUTPUT | | | LINEAR ENCODER PULSE COUNT VALUE | COIL TERMINAL OUTPUT VOLTAGE | | |
|---|---|---|---|---|---|---|
| u | v | w | | U | V | W |
| H | L | H | 1 | 0.5 | 1 | 0 |
| H | L | H | 2 | 0 | 1 | 0.5 |
| H | L | H | 3 | 0 | 1 | 0.5 |
| H | L | H | 4 | 0.5 | 1 | 0 |
| H | L | H | 5 | 0 | 1 | 0.5 |
| H | L | H | 6 | 0 | 1 | 0.5 |
| H | L | H | 7 | 0.5 | 1 | 0 |
| H | L | H | 8 | 0 | 1 | 0.5 |
| H | L | H | 9 | 0 | 1 | 0.5 |
| H | L | H | 10 | 0 | 1 | 0.5 |
| H | L | H | 11 | 0 | 1 | 0.5 |
| H | L | H | 12 | 0 | 0.5 | 1 |
| H | L | H | 13 | 0 | 1 | 0.5 |
| H | L | H | 14 | 0 | 1 | 0.5 |
| H | L | H | 15 | 0 | 0.5 | 1 |
| H | L | H | 16 | 0 | 1 | 0.5 |
| H | L | H | 17 | 0 | 1 | 0.5 |
| H | L | L | 1 | 0 | 1 | 0.5 |
| H | L | L | 2 | 0 | 0.5 | 1 |
| H | L | L | 3 | 0 | 0.5 | 1 |

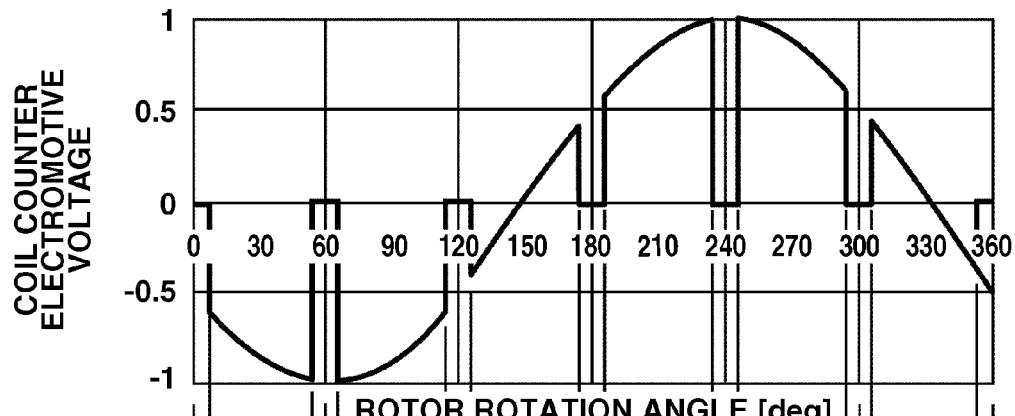
FIG.12A U-PHASE COIL COUNTER ELECTROMOTIVE VOLTAGE WAVEFORM (BETWEEN U-PHASE COMMON TERMINALS)
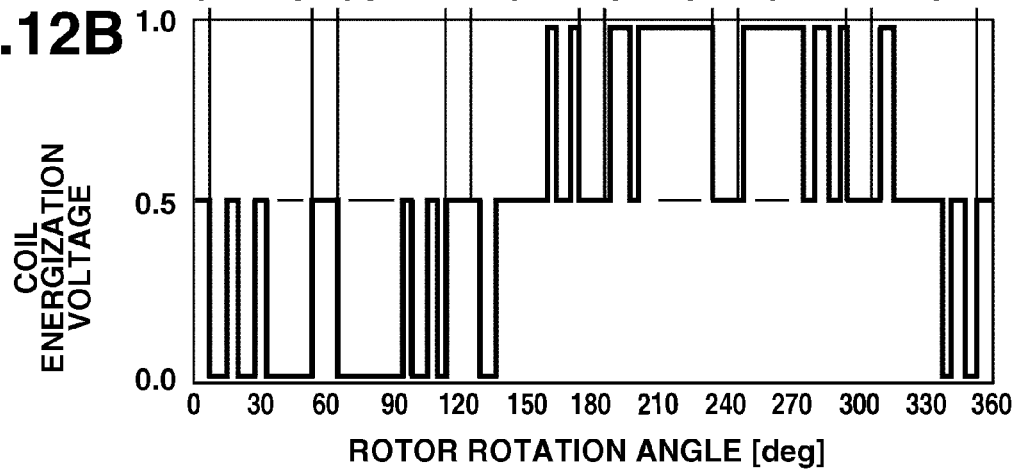
FIG.12B U-PHASE COIL ENERGIZATION VOLTAGE WAVEFORM FIG.14A
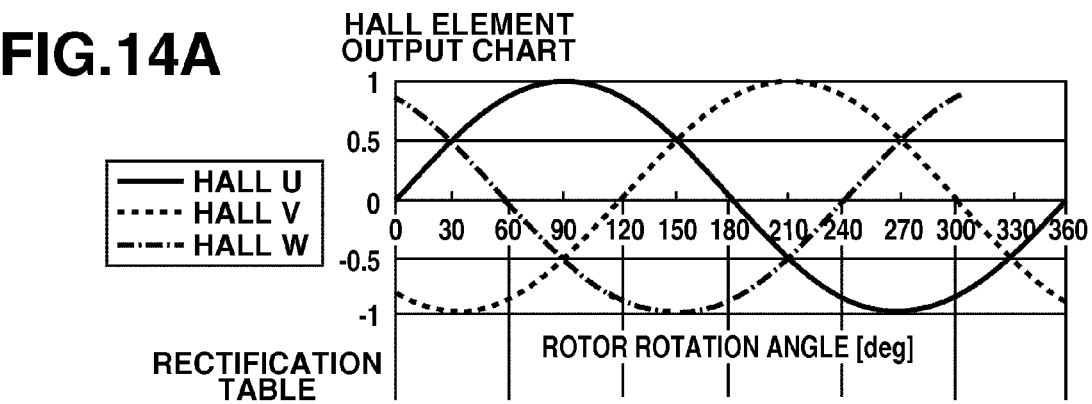
FIG.14B
| | | | | | | |
|---|---|---|---|---|---|---|
| HALL U | H | H | H | L | L | L |
| HALL V | L | L | H | H | H | L |
| HALL W | H | L | L | L | H | H |
| COIL U | L | L | N.C. | H | H | N.C. |
| COIL V | H | N.C. | L | L | N.C. | H |
| COIL W | N.C. | H | H | N.C. | L | L |
FIG.14C
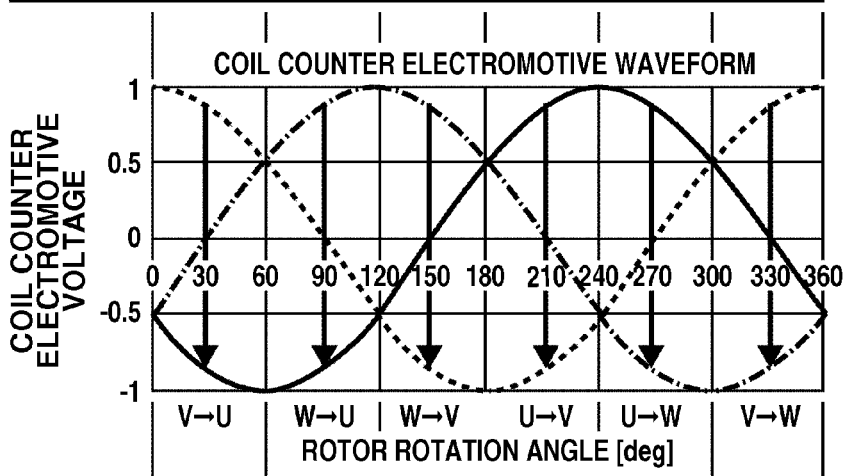
FIG.14D
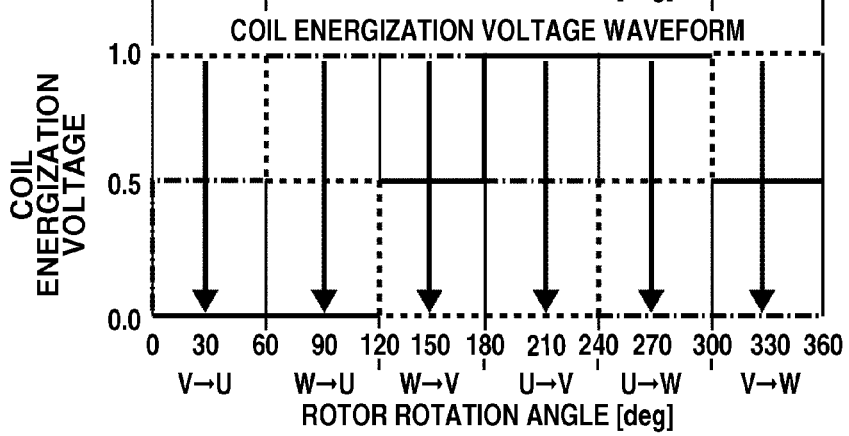

FIG.15A U-PHASE COIL COUNTER ELECTROMOTIVE VOLTAGE WAVEFORM (BETWEEN U-PHASE COMMON TERMINALS)
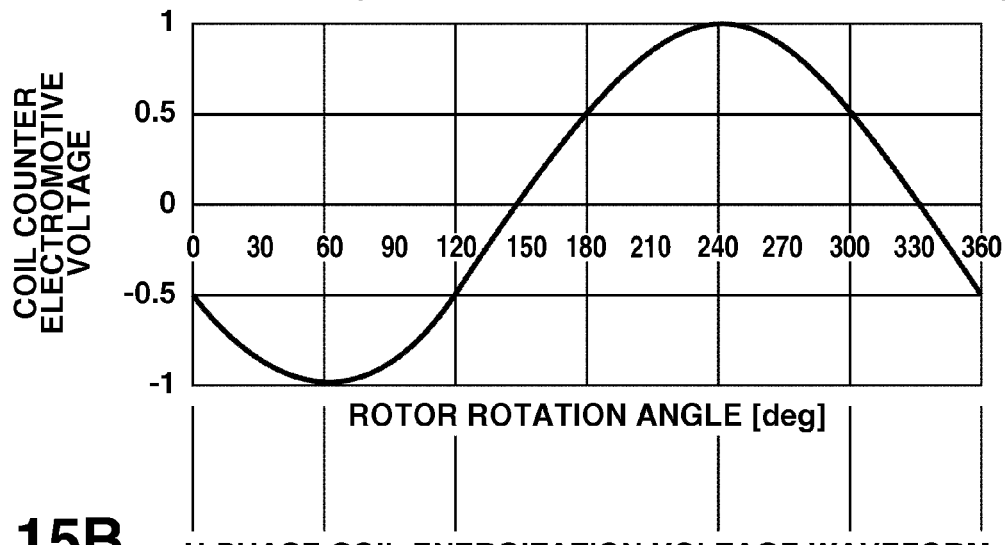
FIG.15B U-PHASE COIL ENERGIZATION VOLTAGE WAVEFORM
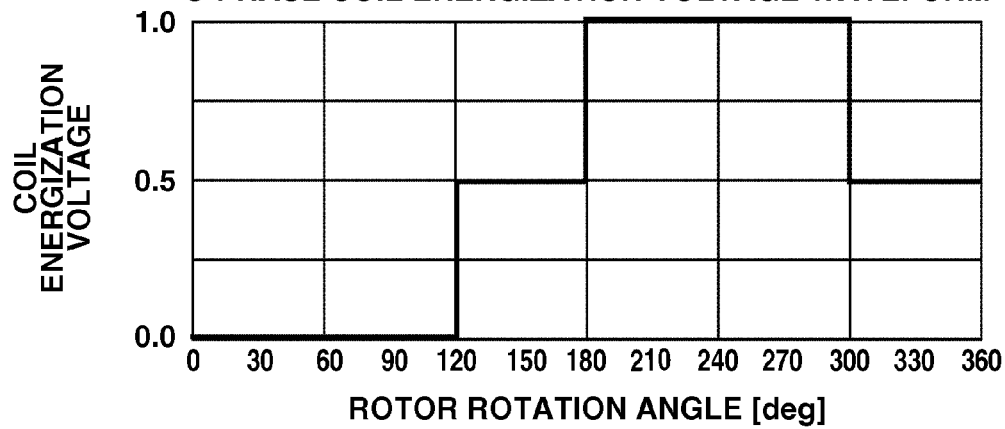

APPARATUS EQUIPPED WITH MOTOR

BACKGROUND OF THE INVENTION

1. Field of the Invention

The present invention relates to an apparatus driving a driven member by a DC brushless motor.

2. Description of the Related Art

FIG. 13 is a block diagram for driving the carriage of a conventional common inkjet recording apparatus. In FIG. 13, a belt 2 is integrally connected to a carriage 1 on which a recording head (not illustrated) is mounted. Arranged at one end of the belt 2 is an idler pulley 3 rotatably supported while maintaining tension with respect to the belt 2. Arranged at the other end of the belt 2 is a driving pulley 5. The driving pulley 5 is integrally engaged with a carriage motor (hereinafter referred to as the "carriage (CR) motor") 4 serving as a drive source. Thus, the carriage 1 is supported so as to be slidable in response to the rotation of the CR motor 4. Printing on a medium such as paper is conducted by discharging ink from a recording head while performing scanning with the carriage 1 in response to the rotation of the CR motor 4.

As the CR motor 4, there is employed a brushless electric motor called a DC brushless motor. The CR motor 4 contains a plurality of Hall elements 6 for detecting the timing with which switching of energization of each coil in the CR motor 4 is effected. The plurality of Hall elements 6 detect a region where a rotor magnetic pole in the CR motor 4 is situated. Each Hall element 6 outputs a detection signal indicating the timing with which energization switching for each coil in the CR motor 4 is effected. The detection signal also indicates the region where the rotor magnetic pole in the CR motor 4 is situated.

To detect the position of the carriage 1 in the sliding direction (scanning direction), there is arranged a linear encoder 8. The linear encoder 8 includes a scale 8 and a sensor main body 1a. The scale 8a is arranged on the printer main body side so as to extend in the scanning direction of the carriage 1. The scale 8a is provided with a plurality of slits arranged at predetermined intervals. The sensor main body 1a, which is a sensor having a light emitting portion and a light receiving sensor, is mounted to the carriage 1. As the carriage 1 moves, the sensor main body 1a detects the slits of the scale 8a. Each time it detects a slit, the sensor main body 1a outputs a detection pulse. The linear encoder 8 indicates the position of the carriage 1 by the number of output detection pulses.

On the printer main body side, a read-only memory (ROM) 10 stores a program necessary for driving the carriage 1 and other related members through a predetermined operation, and data such as initial values. A microprocessor unit (MPU) 9 reads the program and data from the ROM 10, and performs necessary computation while temporarily storing data being computed in an external random-access memory (RAM) 11. Further, the MPU 9, which also serves as an external communication unit, communicates with an external apparatus via an interface 12, conducting various kinds of processing.

Detection pulses, which constitute positional information on the carriage 1, are input to the MPU 9 via a buffer (not illustrated). Inside the MPU 9, a pulse counting unit 9a counts the detection pulses, and outputs the count value of the detection pulses to an acceleration/deceleration computation unit 9b.

Based on the count value of the detection pulses, the acceleration/deceleration computation unit 9b outputs a drive command for the CR motor 4, such an acceleration/deceleration signal and a rotating direction signal. The drive command is input to a CR motor driving circuit 7 via a gate array 13.

The CR motor driving circuit 7 controls the rotation of the CR motor 4 in accordance with the drive command from the acceleration/deceleration computation unit 9b and the detection signal from each Hall element 6. As a result, the carriage 1 performs a predetermined operation.

Such a construction is not restricted to an ink jet recording apparatus but is also applicable to apparatuses controlling the movement of a driven member by using a linear encoder.

FIGS. 14A through 14D are diagrams illustrating the output of each Hall element 6 in the conventional common CR motor (DC brushless motor) 4, the output from the CR motor driving circuit 7 to each coil in the CR motor 4, and the voltage condition of each coil in the CR motor 4.

The CR motor 4, which is a DC brushless motor, is driven in a stable manner by varying the energization combination in each coil in the CR motor 4 according to the high/low (H/L) combination in the output of each Hall element 6 in the CR motor 4. As the coils in the CR motor 4, there are used Y-connection coils U, V, and W, one end of each of which is subjected to common connection. In the following, the other end of the coil U will be referred to as the coil U terminal, the other end of the coil V will be referred to as the coil V terminal, and the other end of the coil W will be referred to as the coil W terminal.

As the plurality of Hall elements 6, there are used Hall elements u, v, and w. The Hall elements u, v, and w generate a sinusoidal wave assuming positive potential when an N-pole in the rotor in the CR motor 4 comes close thereto and negative potential when an S-pole in the rotor comes close thereto. FIG. 16 illustrates the driving circuit for the brushless motor discussed in U.S. Pat. No. 4,882,511. A pair of coils (coils 21 and 22; coils 23 and 24; coils 25 and 26) are connected in a Y-shape. The input terminals of driver amplifiers 46, 47, and 48 are respectively connected to position sensors 42, 43, and 44. The output terminals of the driver amplifiers 46, 47, and 48 are respectively connected to the coils.

In the Hall element output chart of FIG. 14A, the solid line indicates the output of the Hall element u, the broken line indicates the output of the Hall element v, and the alternate long and short dash line indicates the output of the Hall element w. The respective outputs of the three Hall elements u, v, and w are out of phase with respect to each other by 120 degrees in terms of energization angle.

The rectification table (energization table) of FIG. 14B illustrates the relationship between the outputs of the Hall elements u, v, and w and the pattern of energization of the coil U terminal, the coil V terminal, and the coil W terminal. According to the rectification table, in a combination in which the output of the Hall element u is "H" (at high level), the output of the Hall element v is "L" (at low level), and the output of the Hall element w is "H", the CR motor driving circuit 7 outputs "L", "H", and "OPEN" signals to the coil U terminal, the coil V terminal, ant the coil W terminal, respectively. In the rectification table, "OPEN" is shown as "N.C.". The signals from the CR motor driving circuit 7 are referred to as the coil energization voltage waveform.

In the waveform chart of FIG. 14C, U-C, V-C, and W-C shown in the explanatory note indicate a counter electromotive voltage waveform representing the coil U terminal, the coil V terminal, and the coil W terminal as seen from a common terminal C. Referring to the waveform diagram of FIG. 14C, in the first Hall element output combination, a large counter electromotive voltage in the negative direction has been generated in the coil U; a large counter electromotive voltage in the positive direction has been generated in the coil V; and, in the coil W, the counter electromotive voltage is at low level. This means, in terms of efficiency, that electric current is passed from a phase in which the counter electromotive voltage in the positive direction is large to a phase in which the counter electromotive voltage in the negative direction is large.

The waveform diagram of FIG. 14D shows the waveform of the voltage from the CR motor driving circuit 7; it shows that, by setting the coil V terminal (broken line) to H level and by setting the coil U terminal (solid line) to L level, energization is effected from the coil V terminal to the coil U terminal. Similarly, as illustrated, there are other five combinations of the outputs of the Hall elements u, v, and w (see the rectification table); through six combinations in total, rectification is continuously effected on the coils U, V, and W, and the rotation of the CR motor 4 continues.

FIGS. 15A and 15B are diagrams which re-represent the U phase (coil U) of the coil counter electromotive waveform and the energization voltage waveform illustrated in FIGS. 14C and 14D. The graph of FIG. 15A illustrates the counter electromotive voltage waveform between the common terminals of the U-phase coil (coil U terminals), and the graph of FIG. 15B illustrates the energization voltage waveform of the U-phase coil (coil U). Of the energization voltage waveform, the portion thereof that is at "0" indicates the portion where the 0 side (L side) switching element connected to the coil U terminal of the U-phase coil is on, drawing the potential of the U-phase coil to the 0 side (L side). Of the energization voltage waveform, the portion thereof that is at "1" indicates the portion where the 1 side (H side) switching element connected to the coil U terminal of the U-phase coil is on, drawing the potential of the U-phase coil to the 1 side (H side).

When the counter electromotive voltage waveform is large on the negative side, large torque is generated by drawing the potential of the coil to the L side; and, when the counter electromotive voltage waveform is large on the positive side, large torque in the direction opposite to the L side is generated by drawing the potential of the coil to the H side.

In FIGS. 15A and 15B, the portions that are at "0.5" indicate that the two switching elements connected to the coil U terminal of the U-phase coil are both off. In this state, no positive energization to the U-phase coil is being effected.

The combination of the Hall elements in the DC brushless motor is fixed while the rotor magnetic pole in the DC brushless motor is situated in a certain region. Thus, in the state in which the rotor in the DC brushless motor is rotating, there is no change in the combination of the output levels of the Hall elements, even if the position of the rotor inside the DC brushless motor is somewhat changed.

As described above, by using a linear encoder, it is possible to detect fluctuation in the speed of a moving driven member. However, in the conventional method in which the DC brushless motor is controlled based on the outputs of the Hall elements, it is impossible to perform control to suppress this fluctuation in speed.

SUMMARY OF THE INVENTION

The present invention is directed to a motor driving apparatus and a motor driving method.

According to an aspect of the present invention, an apparatus includes a driven member, a DC brushless motor, a first signal generation unit configured to output a first signal according to rotation of the DC brushless motor and to change an output value of the first signal each time the DC brushless motor rotates by a predetermined amount, a movement unit configured to move the driven member by a driving force of the DC brushless motor, a second signal generation unit configured to output a second signal each time the driven member moves by the predetermined amount, and a control unit configured to control driving of the DC brushless motor based on the output value of the first signal and a value of a number of times that the second signal is output during a period in which the DC brushless motor rotates by a predetermined amount.

According to another aspect of the present invention, a method for driving a driven member includes outputting a first signal according to rotation of a DC brushless motor and changing an output value of the first signal each time the DC brushless motor rotates by a predetermined amount, moving the driven member by a driving force of the DC brushless motor, outputting a second signal each time the driven member moves by the predetermined amount, and controlling driving of the DC brushless motor based on the output value of the first signal and a value of a number of times that the second signal is output during a period in which the DC brushless motor rotates by a predetermined amount.

Further features and aspects of the present invention will become apparent from the following detailed description of exemplary embodiment embodiments with reference to the attached drawings.

BRIEF DESCRIPTION OF THE DRAWINGS

The accompanying drawings, which are incorporated in and constitute a part of the specification, illustrate exemplary embodiment embodiments, features, and aspects of the invention and, together with the description, serve to explain the principles of the invention.

FIGS. 2A and 2B are diagrams illustrating ideal linear voltage driving.

FIGS. 3A and 3B are diagrams illustrating voltage driving according to an exemplary embodiment of the present invention.

FIGS. 4A through 4E are diagrams illustrating the details of voltage driving according to an exemplary embodiment of the present invention.

FIG. 6 is a diagram showing an example of an energization table used in an exemplary embodiment of the present invention.

FIG. 7 is a time series chart of an energization pattern adopted in an exemplary embodiment of the present invention.

FIG. 8 is a time series chart of an energization pattern adopted in an exemplary embodiment of the present invention.

FIGS. 12A and 12B are explanatory views of a non-energization section in a modification of an exemplary embodiment of the present invention.

FIG. 14A through 14D are diagrams illustrating a conventional coil rectification system.

FIGS. 15A and 15B are diagrams illustrating a U-phase in the conventional coil rectification system.

DESCRIPTION OF THE EMBODIMENTS

Various exemplary embodiment embodiments, features, and aspects of the invention will be described in detail below with reference to the drawings.

Figure 1:
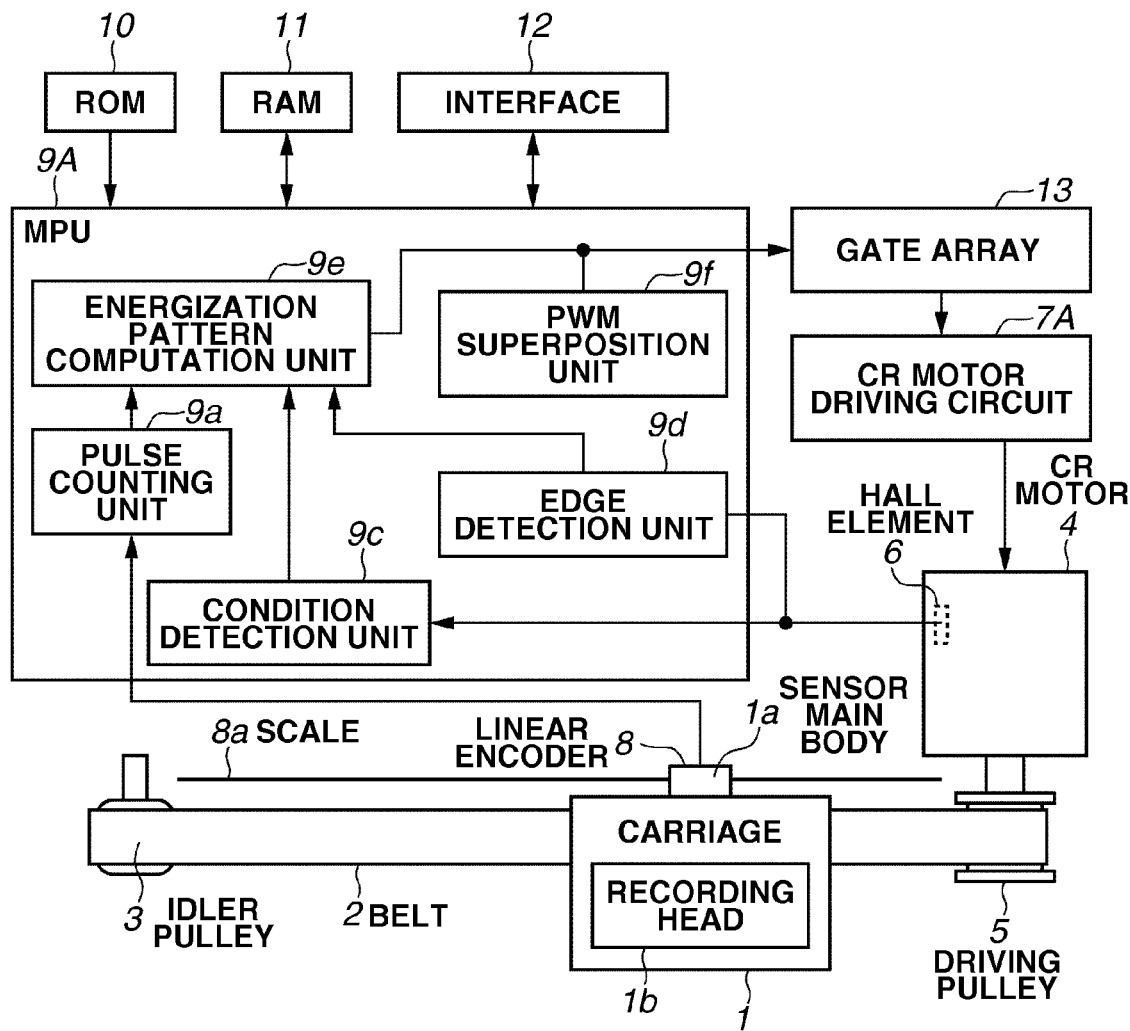
FIG. 1 is a block diagram illustrating an ink jet recording apparatus according to an exemplary embodiment of the present invention.
Figure 13:
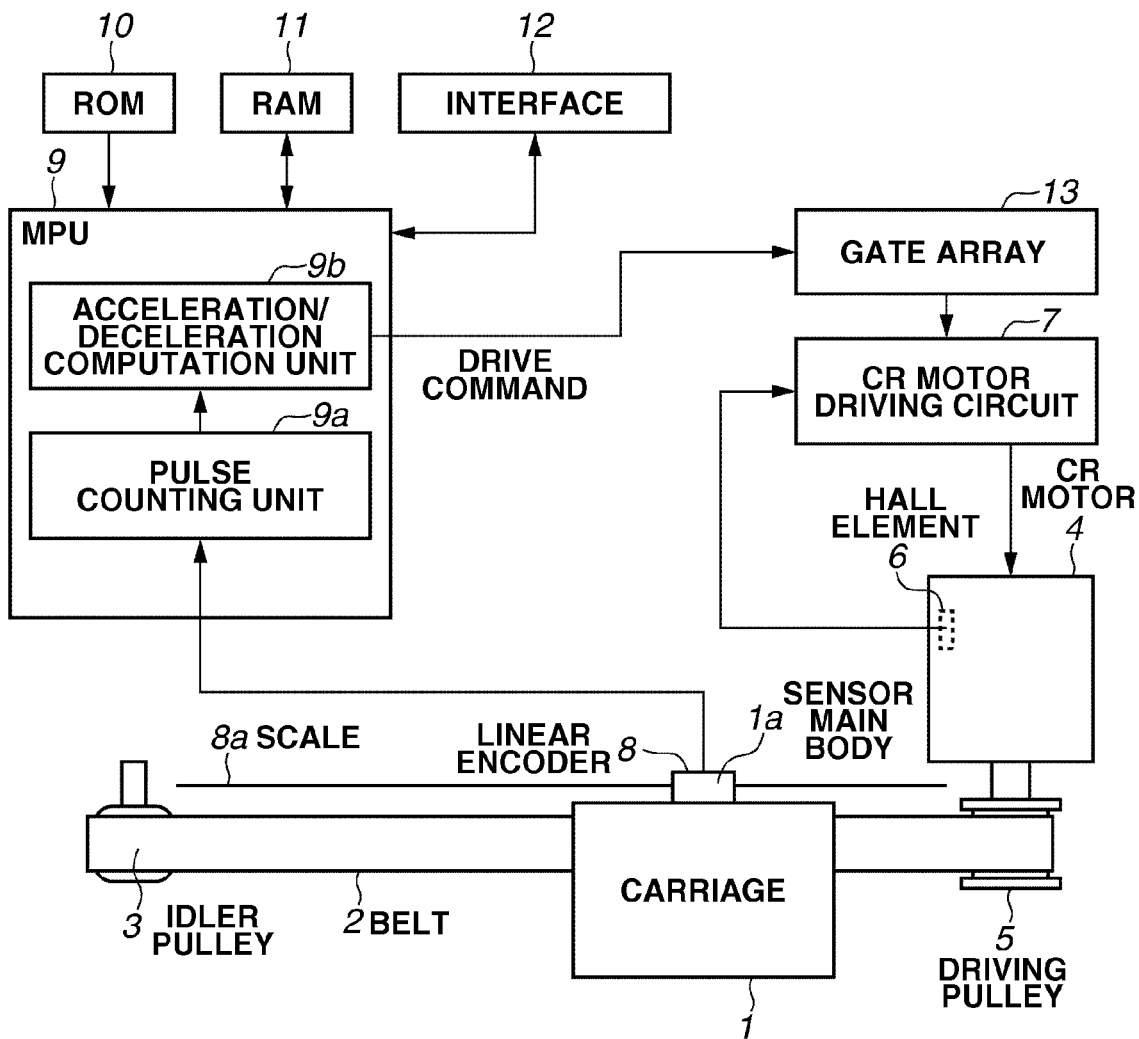
FIG. 13 is a block diagram illustrating a conventional ink jet recording apparatus.
Figure 16:
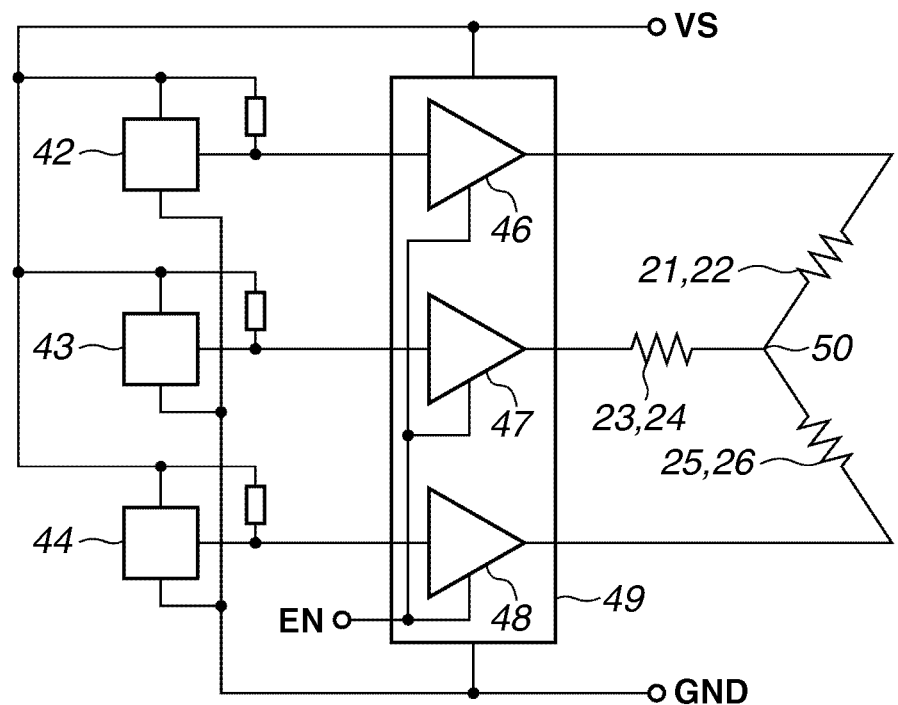
FIG. 16 is an explanatory view of a conventional motor drive circuit.

FIG. 1 is a block diagram illustrating an ink jet recording apparatus according to an exemplary embodiment of the present invention. An ink jet recording apparatus is taken as an example of an apparatus equipped with a motor. In FIG. 1, the components that are the same as those of FIG. 13 are indicated by the same reference numerals. A carriage 1 is an example of a driven member. A recording head 1b is mounted on the carriage, and the recording head 1b performs scanning, discharging ink onto a recording medium. Through this recording operation, an image is recorded on the recording medium.

In the ink jet recording apparatus illustrated in FIG. 1, there are used, instead of the MPU 9 and the CR motor driving circuit 7 illustrated in FIG. 13, an MPU 9A and a CR motor driving circuit 7A. Detection signals for Hall elements 6 are input to the MPU 9A.

The CR motor 4, which is a DC brushless motor, includes a rotor having a magnet with north poles and south poles arranged alternately in the rotating direction, a core provided with a plurality of protruding poles opposing the magnet in the radial direction and constituting a magnetic circuit, and a stator formed by coils wound around the protruding poles.

A plurality of Hall elements 6 in the CR motor 4 are an example of a rotor magnetic pole position detection unit; they detect a region in which the rotor magnetic poles are situated in the CR motor 4, i.e., the DC brushless motor, and output detection signals indicating the detection results. The detection signals are the detection results of the rotor magnetic pole position detection unit. In other words, the plurality of Hall elements 6 are signal generation units outputting "H" signals and "L" signals. The signal generation units output signals as the DC brushless motor rotates, changing the output value of the signals each time the DC brushless motor rotates by a predetermined amount.

A linear encoder 8 is an example of a carriage position detection unit, and includes a scale 8a arranged on the printer main body side to extend along the scanning direction of the carriage 1, and a sensor main body 1a mounted to the carriage 1. A plurality of slits provided in the scale 8a at predetermined intervals are an example of an indicator. The sensor main body 1a detects the slits of the scale 8a as the carriage 1 moves, outputting a detection pulse each time a slit is detected. The linear encoder 8 indicates the position of the carriage by the output number of detection pulses. The detection pulses are the detection results of the carriage position detection unit. In other words, the linear encoder 8 is a signal generation unit outputting signals each time the carriage 1 moves by a predetermined amount.

The MPU 9A is an example of a control unit, which controls the energization of each coil in the CR motor 4 according to the detection results of the linear encoder 8 and the detection results of the Hall elements 6. The MPU 9A includes a pulse counting unit 9a, a condition detection unit 9c, an edge detection unit 9d, an energization pattern computation unit (energization pattern acquisition unit) 9e, and a pulse-width modulation (PWM) superposition unit 9f.

The condition detection unit 9c checks the H (H level)/L (L level) condition of the detection signals of the plurality of Hall elements 6. The H/L combination of the detection signals of the plurality of Hall elements 6 indicates the region in the CR motor 4 where the rotor magnetic poles are situated. There are six H/L combinations of the detection signals.

The edge detection unit 9d detects a switching in the H/L combination of the detection signals of the plurality of Hall elements 6. The switching in the H/L combination of the detection signals of the plurality of Hall elements 6 means a switching in the region in the CR motor 4 where the rotor magnetic poles are situated.

The energization pattern computation unit 9e controls the energization of each coil in the CR motor 4 based on the H/L condition of the detection signals of the Hall elements 6 detected by the condition detection unit 9c and the count value of the pulse counting unit 9a. The energization pattern computation unit 9e has an energization table. In the energization table, the region in the CR motor 4 where the rotor magnetic poles are situated, the position of the carriage 1, and the energization pattern for each coil in the CR motor 4 are shown in correspondence with each other.

In the present exemplary embodiment, the energization pattern for each coil is indicated by the voltage level ("H," "L," and "N.C. (open)") applied to each coil. Further, in the energization table, the position of the carriage 1 is indicated by the number of detection pulses from the linear encoder 8, more specifically, by a number up to a predetermined number from a value obtained by adding "1" to the initial value of the pulse counting unit 9a.

The energization pattern computation unit 9e refers to the energization table, and identifies the energization pattern related to the region detected by each Hall element 6 and to the position of the carriage 1 detected by the linear encoder 8. The energization pattern computation unit 9e outputs the identified energization pattern. Further, when the edge detection unit 9d detects a switching in the H/L combination of the detection signals of the Hall elements 6, the energization pattern computation unit 9e resets the count value of the pulse counting unit 9a to the initial value (which, in the present exemplary embodiment, is "0").

The PWM superposition unit 9f superposes a PWM signal on the energization pattern from the energization pattern computation unit 9e, and outputs the superposition result to the CR motor driving circuit 7A via a gate array 13. In other words, the PWM superposition unit 9f can be referred to as a combine unit. The PWM superposition unit (combine unit) 9f combines a PWM signal on the energization pattern from the energization pattern computation unit 9e, and outputs the combine result to the CR motor driving circuit 7A via a gate array 13. The CR motor driving circuit 7A controls the energization of each coil in the CR motor 4 according to the output from the PWM superposition unit 9f.

In the present exemplary embodiment, at the time of movement of the carriage 1, a detection pulse from the sensor main body 1a of the linear encoder 8 and a detection signal from each Hall element 6 are simultaneously input to the MPU 9A.

When the carriage 1 moves, the pulse counting unit 9a counts in succession the number of detection pulses from the sensor main body 1a. Further, the detection signals from the Hall elements 6 are also constantly input to the MPU 9A, and the condition detection unit 9c checks the H/L condition of the detection signals from the Hall elements 6.

In the present exemplary embodiment, each section during which the detection signal from each Hall element 6 is fixed in an ideal condition is previously divided into the number of detection pulses (ideal pulse number, e.g., 18) output from the sensor main body 1a during that section. The section corresponding to one rotation of the rotor is divided into six sections based on the outputs of the Hall elements 6. Then, each of the sections thus obtained through division is divided into n sections, which corresponds to the ideal pulse number. This makes it possible to determine 6×n sections for the energization of the coils. Identification is possible based on the value of the signal from each Hall element 6 and the number of detection pulses output from the sensor main body 1a. These parameters are determined based on the construction of the DC brushless motor 4 and the movement amount of the carriage 1 with respect to the rotation amount of the DC brushless motor 4.

As a result, by using the outputs of the Hall elements 6 and the detection pulse number, it is possible to detect 6×n rotor magnetic pole positions in the CR motor 4, whereas, with the outputs of the Hall elements 6 alone, it has only been possible to detect six rotor magnetic pole positions. Thus, in the present exemplary embodiment, it possible to energization condition of the coils according to 6×n rotor magnetic pole positions in the CR motor 4, making it possible to realize a pseudo linear voltage drive.

FIGS. 2A and 2B and FIGS. 3A and 3B are diagrams illustrating examples of the energization voltage waveform the present exemplary embodiment aims to realize. FIGS. 2A and 3A illustrate the counter electromotive voltage waveform between the coil U terminal of the U-phase coil and the common terminal, and FIGS. 2B and 3B illustrate the waveform of the drive voltage applied to the coil U terminal of the U-phase coil.

FIGS. 15A and 15B illustrate the conventional rectangular wave drive voltage waveform, and FIGS. 2A and 2B illustrate the ideal linear voltage drive waveform (sinusoidal wave voltage drive). In the sinusoidal wave drive illustrated in FIGS. 2A and 2B, the motor efficiency with respect to the inflow current is high, making it possible to keep the heat generation in the motor at low level. FIGS. 3A and 3B are diagrams illustrating an example of the output voltage waveform of the present exemplary embodiment. In the waveform illustrated in FIGS. 3A and 3B, the electric current flowing effectively through the coils of the CR motor 4 is brought close to the sinusoidal wave drive illustrated in FIGS. 2A and 2B, and an effect similar to that of the linear voltage drive waveform of the FIGS. 2A and 2B is to be expected.

Of the output voltage waveform in the present exemplary embodiment illustrated in FIGS. 3A and 3B, FIGS. 4A through 4E illustrate in detail the condition in the first section in which the rotor rotation angle ranges from 0 degrees to 60 degrees. In the present exemplary embodiment, 18 (a predetermined number of) detection pulses from the linear encoder 8 are input during the period of time in which the output from each Hall element 6 is fixed.

FIG. 4A illustrates the counter electromotive voltage waveform of the U-phase coil. FIG. 4B is a table showing the relationship between the combination of the outputs from the Hall elements 6 (Hall elements u, v, and w) and the counter number of detection pulses from the linear encoder 8. FIG. 4C is an image diagram illustrating the detection pulses from the linear encoder 8. FIG. 4D is a diagram illustrating an energization table showing the energization pattern for each coil, which is determined by the combination of the outputs from the Hall elements 6 and the count number of the detection pulses from the linear encoder 8. FIG. 4E illustrates a U-phase coil energization waveform representing in waveform the information on the value regarding the U-phase coil illustrated in the coil energization table. The graph of FIG. 4E corresponds to the graph of FIG. 3B.

In the region in which the rotor rotation angle is between 0 and 60 degrees, there are output 18 detection pulses from the linear encoder 8. Thus, for this region, 18 individual coil energization tables are previously set in the energization pattern computation unit 9e. In the present exemplary embodiment, what is obtained by putting together the individual coil energization tables and the table illustrated in FIG. 4B is referred to as the energization table.

Each time a detection pulse is generated from the linear encoder 8, the energization pattern computation unit 9e reads the rectification pattern for the coils in the CR motor 4 from the energization table in accordance with the count value of the pulse counting unit 9a. Thus, each time a detection pulse is generated from the linear encoder 8, it is possible to switch the rectification pattern, whereby it is possible to perform a pseudo linear voltage drive.

Figure 5:
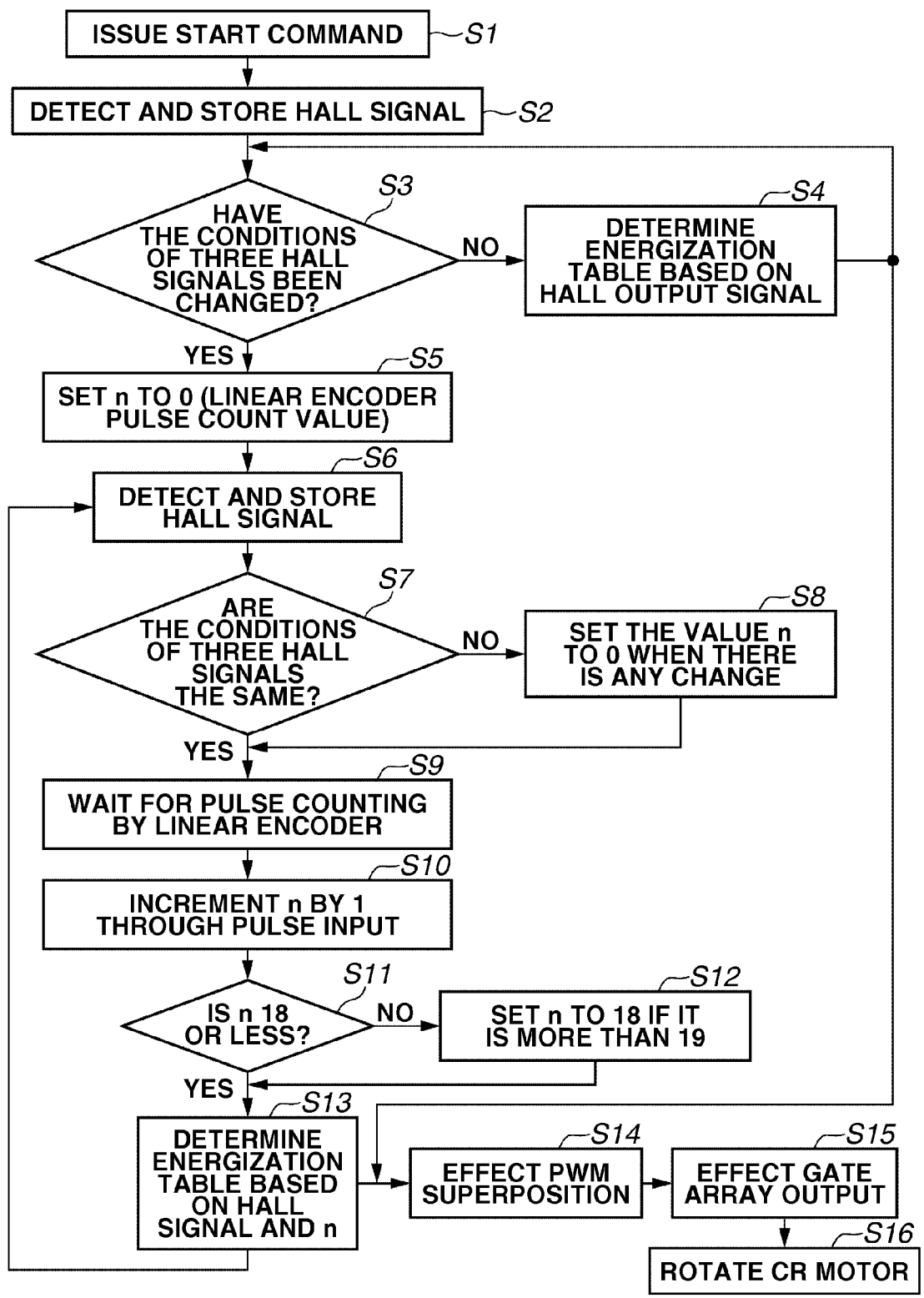
FIG. 5 is a flowchart illustrating an operation according to an exemplary embodiment of the present invention.

FIG. 5 is a flowchart for illustrating a method by which it is possible to cancel the influence of a cumulative error regarding the detection pulses from the linear encoder 8.

In the present exemplary embodiment, a detection pulse from the linear encoder 8 and a detection signal from each Hall element 6 are simultaneously input to the MPU 9A. For each period of time in which the combination of the detection signals from the Hall elements 6 are fixed, there is previously set in the energization pattern computation unit 9e a coil energization table of the number (which, in the present exemplary embodiment, is 18) of detection pulses from the linear encoder input to the MPU 9A in an ideal state. The period in which the combination of the detection signals from the Hall elements 6 is fixed means the period in which the rotor magnetic poles in the CR motor 4 belong to a certain region.

In step S1, a start command for the CR motor 4 is input to the MPU 9A via the interface 12. Next, in step S2, the condition detection unit 9c detects the condition of the detection signal from each Hall element 6 and retains the detection result. Next, in step S3, the edge detection unit 9d checks whether there has been a change in the condition of the detection signal from each Hall element 6. Here, in the case where there is no change in the condition of the detection signal from each Hall element 6 from that detected in step S2, the edge detection unit 9d outputs to the energization pattern computation unit 9e an edge detection signal indicating there is no change.

In step S4, upon receiving the edge detection signal indicating there is no change, the energization pattern computation unit 9e refers to the rectification table illustrated in FIG. 14B, and determines the energization pattern related to the region detected for each Hall element 6. In the present exemplary embodiment, it is assumed that the energization pattern computation unit 9e has the rectification table as illustrated in FIG. 14B.

In step S14, the energization pattern computation unit 9e outputs the identified energization pattern, and the PWM superposition unit 9f superposes a PWM signal on the energization pattern from the energization pattern computation unit 9e. In step S15, the PWM superposition unit 9f outputs the superposition result to the gate array 13, and the gate array 13 outputs the superposition result to the CR motor driving circuit 7A. In step S16, the CR motor driving circuit 7A rotates the CR motor 4 in accordance with the superposition result. As the CR motor 4 rotates, the belt 2 is driven. The carriage 1 on which the recording head 1b is mounted is fixedly connected with the belt 2. Thus, the carriage 1 performs scanning through the rotation of the CR motor 4. The above sequence is mainly one to be assumed at the time of starting the CR motor 4 when the power is turned on.

The procedures will be illustrated again starting from step S4 involving branching. In step S3, even after the energization pattern has been determined solely from the detection signal from each Hall element 6, the edge detection unit 9d returns to the sequence in which the change in the detection signal from each Hall element 6 is always monitored. After this, when it detects a change in the detection signal from each Hall element 6, the edge detection unit 9d outputs to the energization pattern computation unit 9e an edge detection signal indicating there is a change.

When, in step S5, it receives an edge detection signal indicating there is a change, the energization pattern computation unit 9e proceeds to a sequence in which the count vale n of the pulse counting unit 9a is reset to "0," which is the initial value. Here, in step S6, the condition detection unit 9c further detects the condition of the detection signal from each Hall element 6, and retains the detection result. Further, in step S7, the edge detection unit 9d monitors a change in the detection signal from each Hall element 6. In step S9, in the operational flow from the initial stage, there is no change at this point in time, so that the counting of the detection pulses from the linear encoder 8 is waited for.

When, in step S10, there is a detection pulse input from the linear encoder 8, the pulse counting unit 9a performs the processing of n=n+1. In step S11, the energization pattern computation unit 9e determines whether the count value n is 18 or less. When the count value n is 18 or less, then in step S13, the energization pattern computation unit 9e determines a coil energization table based on the combination of the output levels of the detection signals from the Hall elements 6 and the count value n. The energization pattern computation unit 9e outputs the energization pattern indicated in that coil energization table, and, from this onward, the driving processing of the CR motor 4 proceeds along the sequence of steps S14, S15, and S16, and the CR motor 4 rotates.

At the same time, the processing of the MPU 9A returns to the sequence of step S6 again, and, subsequently, the processing of step S7 is executed; when there is no change, the procedure advances similarly to steps S9 and S10, and, in step S11, it is determined whether the count value n is 18 or less. Here, when the count value n is more than 18, the energization pattern computation unit 9e sets the count value n to 18 instep S12, and the procedure advances to step S13 again, with energization being continued by using the same coil energization table (the coil energization table for n=18).

Thus, when 19 pulses or more are input where 18 detection pulses are to be input while the combination of the outputs of the Hall elements 6 are fixed, the coil energization table corresponding to n=18 continues to be used.

Thus, when 19 pulses or more are input, the energization is continued in the same energization pattern until there is a change in the combination of the outputs from the Hall elements 6. As a result, it is also possible to deal with a case where the number of detection pulses from the linear encoder 8 has become larger than the ideal pulse number while the combination of the outputs from the Hall elements 6 is fixed.

Next, to be illustrated will be a case where only 17 detection pulses are input where 18 detection pulses are to be input, with the combination of the outputs from the Hall elements 6 being changed at that point in time.

In step S7, it is determined whether the condition of the detection signals from the Hall elements 6 has been changed. In the case where there has been a change, the energization pattern computation unit 9e executes in step S8 the setting of the count value n to 0, and, in step S9, the count input of the detection pulses from the linear encoder 8 is waited for. Next, in step S10, when the detection pulses are input, there is executed the processing of setting the count n to n+1, and, in step S13, there is determined a coil energization table which is specified by the new combination of the detection signals from the Hall elements 6 and by n=1. Then, the energization pattern computation unit 9e controls the energization of the coils in the CR motor 4 according to the energization pattern indicated by the coil energization table determined. Thus, in step S16, the CR motor 4 is rotated in a stable manner.

In this way, in the sequence illustrated in FIG. 5, the number of pulses output from the linear encoder 8 continues to be reset at the point in time when there is a change in the combination of the detection signals of the Hall elements 6. Thus, it is possible to change the energization pattern for the coils such that the pseudo linear voltage drive is effected continuously.

FIG. 6 illustrates an example of the energization table referred to in step S13 of the flowchart illustrated in FIG. 5. FIG. 6 illustrates the output voltage (energization pattern) for the coil terminals in a case where the combination of the detection signals from the Hall elements u, v, and w is "H/L/H" and where the count value of the pulse counting unit 9a is 1 to 18. FIG. 6 also partially illustrates the output voltage (energization pattern) for the coil terminals in a case where the combination of the outputs of the Hall elements u, v, and w next to "H/L/H" is "H/L/L" and where the count value of the pulse counting unit 9a is from "1" onward.

In the coil terminal voltages U, V, and W illustrated in FIG. 6, "0.5" indicates a state in which the switching elements on the H side and the L side connected to the coil terminals are in the OFF state and in which the coil potential has not been determined yet. "0" indicates that the L side switching element connected to the coil terminals has been turned ON to draw the L side potential of the coils. "1" indicates that the H side switching element connected to the coil terminals has been turned ON to draw the H-side potential of the coils.

In FIG. 6, the coil terminal output voltage U changes as follows: 0.5→0→0→0.5→ . . . ; this is an example of the U-phase coil energization voltage waveform illustrated in FIG. 3B. In this way, in the construction of the present exemplary embodiment, it is possible to perform a pseudo linear voltage drive.

FIG. 7 is a diagram illustrating the time series change results of the energization condition in steps S11 and S12 of the flowchart illustrated in FIG. 5. In the period in which the combination of the detection signals from the Hall elements u, v, and w remains "H/L/H", when the carriage 1 is moving at the ideal speed, 18 pulses are input from the linear encoder 8. In FIG. 7, a case will be described in which 20 pulses are input from the linear encoder 8 in the period in which the combination of the detection signals from the Hall elements u, v, and w remains "H/L/H". In the condition illustrated in FIG. 7, the carriage 1 is moving at a higher speed than the ideal speed due to the fluctuation in the speed thereof. In this state, the position of the carriage 1 has advanced by 2 slits on the scale 8a. In this condition, the energization pattern computation unit 9e outputs, as the 19th pulse coil terminal output voltage, a voltage that is the same as the 18th pulse coil terminal output voltage. Similarly, the energization pattern computation unit 9e outputs, as the 20th pulse coil terminal output voltage, a voltage that is the same as the 18th pulse coil terminal output voltage. The count value of the pulse counting unit 9a does not increase beyond "18", and the coil terminal output voltage (the energization pattern for each coil) undergoes no change. That is, if the combination of the outputs of the Hall elements 6 is the same, the same voltage is output for the coil energization control from the 18th pulse onward.

FIG. 8 is a diagram illustrating the time series change results of the energization condition in steps S8, S9, and S10 of the flowchart illustrated in FIG. 5. Conversely to the condition illustrated in FIG. 7, in the condition illustrated in FIG. 8, the speed of the carriage 1 is slower than the ideal speed. In this condition, the position of the carriage 1 is delayed by one slit on the scale 8a. In FIG. 8, after 17 pulses (i.e. less than 18 pulses) have been input as the count value of the pulse counting unit 9a, the condition of the combination of the outputs from the Hall elements is changed. In FIG. 8, in the state in which the count value of the pulse counting unit 9a is "17", the combination of the outputs of the Hall elements 6 is changed, and, after this change, the pulses from the linear encoder 8 are input. Thus, in response to the pulse input from the linear encoder 8, the pulse counting unit 9a sets the count value to "1" (the initial value). As a result, the coil energization table the energization pattern computation unit 9e refers to is changed to a new coil energization table.

In the present exemplary embodiment, the MPU 9A as the control unit controls the energization of each coil in the DC brushless motor 4 according to the detection results of the Hall elements 6 as the rotor magnetic pole position detection unit and the detection results of the linear encoder 8 as the carriage position detection unit. The linear encoder 8 detects the position of the carriage 1 performing scanning by the DC brushless motor 4.

Thus, along with the position of the carriage 1, the detection result of the linear encoder 8 also indicates the positions of the rotor magnetic poles in the DC brushless motor 4. Thus, by using the detection results of the Hall elements 6 and the detection result of the linear encoder 8, it is possible to specify in more details the positions of the rotor magnetic poles in the DC brushless motor 4 as compared with the case in which only the detection results of the Hall elements 6 are used.

Thus, the MPU 9A uses the detection results of the Hall elements 6 and the detection result of the linear encoder 8, whereby it is possible to drive the DC brushless motor 4 with higher accuracy and more efficiently as compared with the case in which the energization of each coil is controlled by using solely the detection results of the Hall elements 6. Thus, it is also possible to suppress heat generation in the DC brushless motor 4.

In the present exemplary embodiment, the MPU 9A has an energization table. In the energization table, the region in the CR motor 4 where the rotor magnetic poles are situated, the position of the carriage 1, and the energization pattern for each coil in the CR motor 4 are indicated in correspondence with each other.

The MPU 9A refers to the energization table, and controls the energization of each coil according to an energization pattern which is in correspondence with the region where the rotor magnetic poles exist that is detected by the Hall elements 6 and with the position of the carriage 1 that is detected by the linear encoder 8. Thus, by using the energization table, it is possible to efficiently control the energization of each coil.

In the present exemplary embodiment, the energization table indicates the position of the carriage 1 by the number of detection pulses. The MPU 9A controls the energization of each coil according to an energization pattern in correspondence with the region where the rotor magnetic poles exist that is detected by the Hall elements 6 and with the count value of the pulse counting unit 9a. Thus, it is possible to efficiently control the energization of the coils based on the detected pulse number.

In the present exemplary embodiment, when the detection result of each Hall element 6 changes, the MPU 9A resets the count value of the pulse counting unit 9a. When the count value of the pulse counting unit 9a exceeds the maximum value of the pulse number indicating the position of the carriage 1 in correspondence the existence region in the energization table, the MPU 9A controls the energization of each coil according to the energization pattern in correspondence with the existence region and the maximum value. Thus, it is possible to minimize the influence of the cumulative error of the linear encoder 8.

The above exemplary embodiment allows modification as follows. The MPU 9A as the control unit (more specifically, the energization pattern computation unit 9a) has a plurality of kinds of energization tables. The plurality of kinds of energization tables have, for example, the following relationship. While the position of the carriage 1 indicated for each region where the rotor magnetic poles are situated in the CR motor 4 is the same within the same energization table, a part of the energization pattern for each coil in correspondence with the position of the carriage 1 differs from energization table to energization table.

The MPU 9A switches the energization table to be referred to for coil energization control as needed, switching it, for example, between a case where an absolute torque as in the case of acceleration/deceleration of the carriage 1 (at the time of acceleration drive) and a case where the carriage 1 is driven at a fixed speed to realize low consumption current (at the time of low speed drive).

In this modification, it is possible, for example, to switch the energization pattern for each coil between the acceleration drive of the carriage and the constant speed drive of the same. Thus, it is possible to appropriately perform coil energization control at the time of acceleration drive of the carriage and at the time of constant speed drive thereof.

Further, the above exemplary embodiment and the above modification allow the following modification. The MPU 9A may change the correspondence between the energization pattern for each coil, the existence region, and the detection pulse number shifting the same in a time series fashion in the energization table according to the speed of the carriage 1.

Generally, in a large output DC brushless motor, the electric current to be passed through the coils is also large, and a torque constant is needed, so that, the coil inductance is rather large, and the Hall elements 6 for rotor magnetic pole detection are likely to be affected by the mail coil excitation. As a result, the rotor magnetic pole position detection result in the case of low current and low rotation may differ from the rotor magnetic pole position detection result in the case of high current and high rotation.

Figure 9:
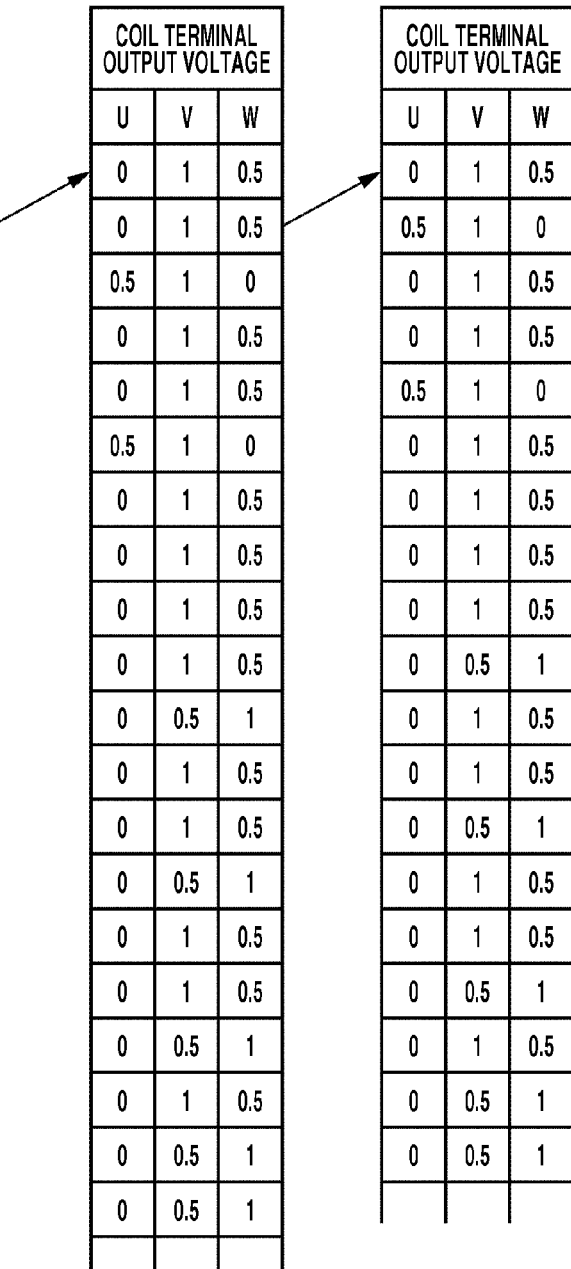
FIG. 9 is an explanatory view of timing control driving adopted in a modification of an exemplary embodiment of the present invention.

In view of this, a method called timing control drive is adopted. As illustrated in FIG. 9, in the present exemplary embodiment also, the MPU 9A can easily detect the rotation speed of the CR motor 4 from the count number of the pulse counting unit 9a, so that timing control drive is easily made possible by adopting an energization table with its data shifted in succession according to the rotation speed of the CR motor 4.

Further, the above exemplary embodiment and the above modification allow the following modification. FIGS. 10A through 10D are conceptual diagrams illustrating a torque generated in an ordinary DC brushless motor in a case where driving is effected by the conventional driving method as illustrated in FIGS. 14A through 14D and FIGS. 15A and 15B.

Figure 10A:
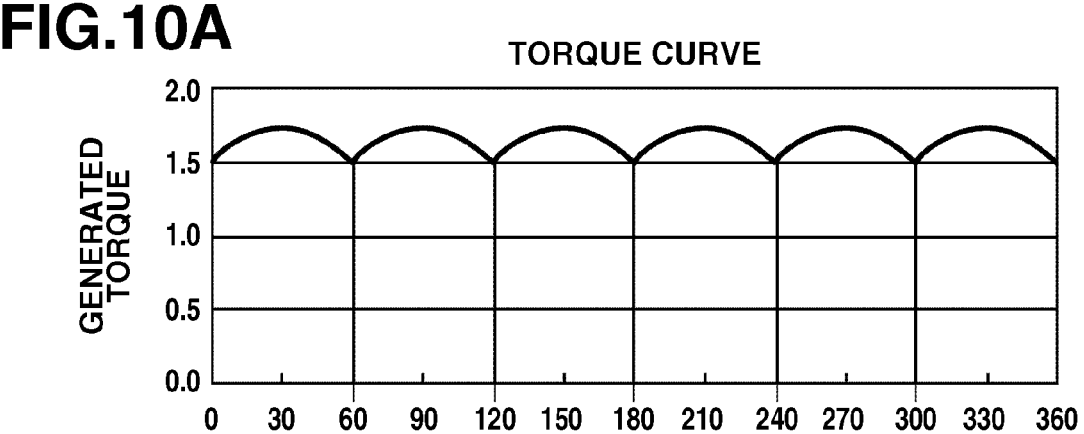
FIGS. 10A through 10D are explanatory views of a torque curve in an exemplary embodiment of the present invention.
Figure 10B:
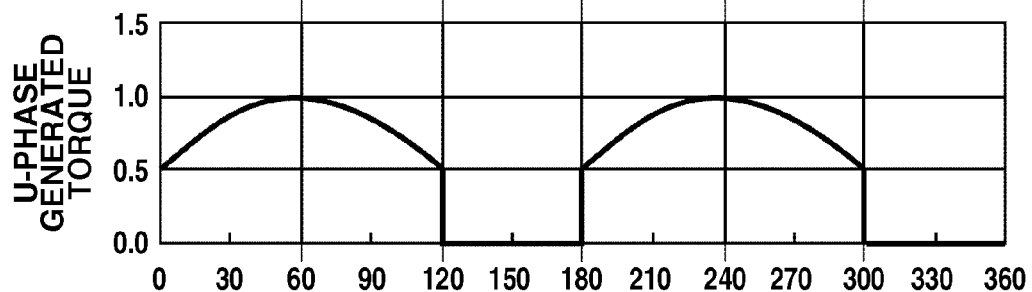
Figure 10C:
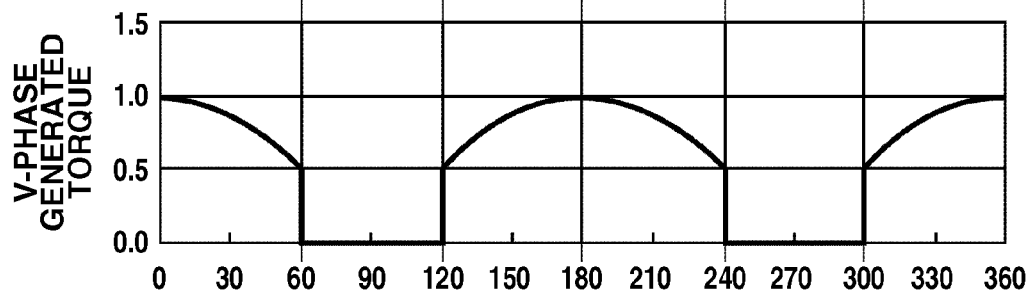
Figure 10D:
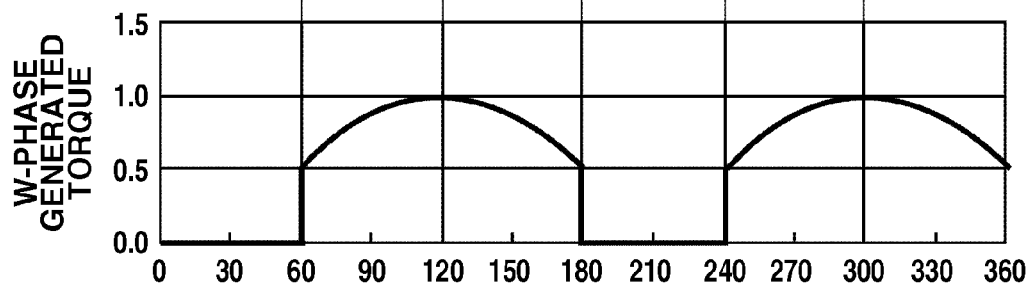
Figure 11A:
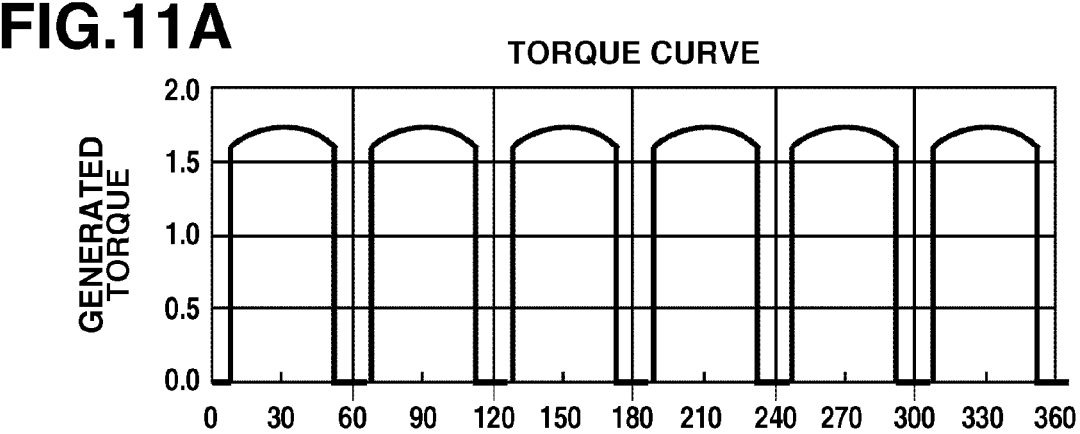
FIGS. 11A through 11D are explanatory views of a non-energization section in a modification of an exemplary embodiment of the present invention.
Figure 11B:
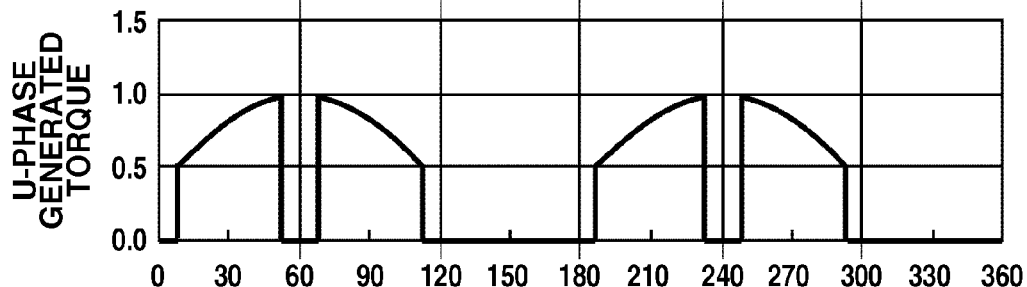
Figure 11C:
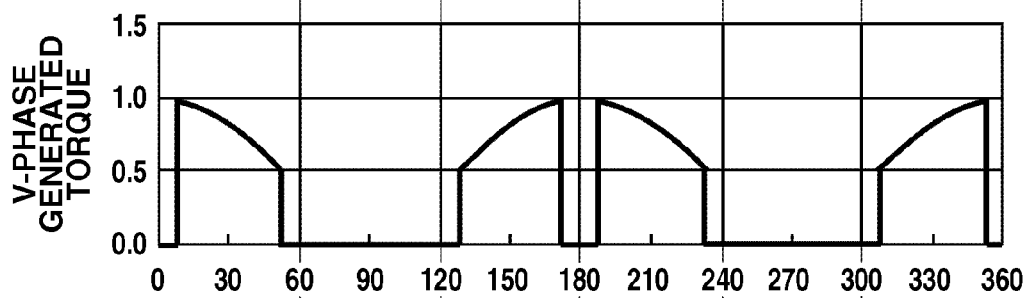
Figure 11D:
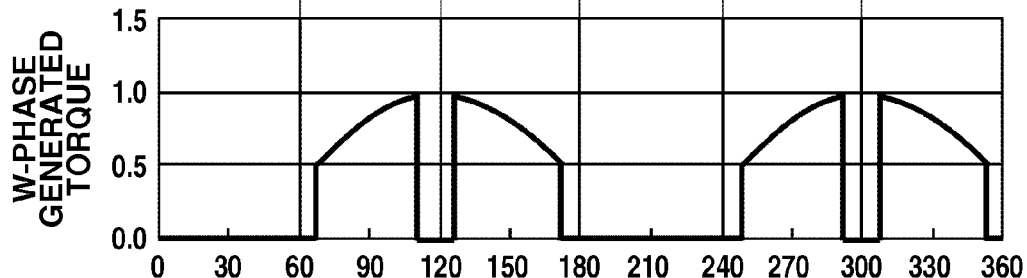

As illustrated in FIGS. 10B, 10C, and 10D, the U-phase coil, the V-phase coil, and the W-phase coil repeatedly undergo, after 120 degrees energization, the states of 60 degrees non-energization, 120 degrees energization, and 60 degrees energization (in this example, a basic minimum magnet pole number is adopted). Then, the counter electromotive voltage waveform of the motor is reversed by 180 degrees between the first 120 degrees energization state and the second 120 degrees energization state. Regarding the U-phase coil, a torque peak position is generated at a 60 degrees position and a 240 degrees position.

The U-phase coil, the V-phase coil, and the W-phase coil are arranged so as to be shifted from each other by 120 degrees, so that when all the three-phase energization states and non-energization states are superimposed one upon the other, a torque curve as illustrated in FIG. 10A is obtained. This torque curve is characterized in that it has a cycle of 60 degrees and that it exhibits a peak at the 30 degrees position, 90 degrees position, 150 degrees position, 210 degrees position, 270 degrees position, and 330 degrees position. If high efficiency is to be aimed at, it might be possible to energize the coils solely at these torque peak positions. That is, as illustrated in FIG. 11, it might be possible to selectively effect energization solely at the torque peak positions. In particular, when the inertia of the rotation load is large, this method proves effective; in FIGS. 11A through 11D, there is provided a non-energization section where the total torque drops.

FIGS. 12A and 12B are diagrams illustrating an example in which the example illustrated in FIGS. 11A through 11D is applied to the energization control of the above exemplary embodiment illustrated in FIGS. 4A through 4E. The portion corresponding to the non-energization section is of a value corresponding to a coil output voltage of "0.5". This allows energization of solely the portion where the torque is large, so that the efficiency of the motor during operation is improved. In this case, the energization pattern for each coil shown in the energization table is set such that a non-energization period is provided with respect to the coils through which an electric current is to be passed.

In addition to what has been described above, a common three-phase 180 degrees energization system can also be easily realized by processing the energization table by a similar method.

The constructions of the exemplary embodiment and the modifications described above have only been illustrated by way of example, and should not be construed restrictively.

Another example of an apparatus equipped with a motor to which the present invention is applicable, in addition to a recording apparatus, is an image reading apparatus. Further, as the driven member, a carriage on which a reading head equipped with a sensor is mounted is applicable.

In addition, the present invention is applicable to an apparatus which is equipped with a movement unit moving a driven member by the driving force of a DC brushless motor and which outputs a signal each time the driven member moves by a predetermined amount.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-109123 filed May 11, 2010, which is hereby incorporated by reference herein in its entirety.

What is claimed is:

1. An apparatus comprising:
    a movable carriage;
    a DC motor configured to rotate to move the carriage, the DC motor including a plurality of coils and a plurality of Hall elements;
    a signal generation unit configured to output signals of the Hall elements indicating a rotational phase of the DC motor;
    an encoder unit configured to output pulse signals indicating a position of the carriage;
    a counter configured to count the pulse signals output from the encoder unit; and
    a control unit configured to control driving of the DC motor by energizing each of the coils,
    wherein the control unit includes a data table in which combinations of the signals of the Hall elements, pulse count values of the encoder unit, and energization patterns for each of the coils of the DC motor are stored in correspondence with each other, and the control unit refers to one of the energization patterns stored in the data table to drive the DC motor according to a count value of the counter and an output of the signal generation unit,
    wherein in a case where the output of the signal generation unit changes, the control unit resets the count value of the counter, and
    in a case where the count value of the counter exceeds a maximum value stored in the data table, the control unit uses one of the energization patterns which corresponds to the maximum value to energize each of the coils.

2. The apparatus according to claim 1 wherein the encoder unit includes a sensor provided on the carriage to detect slits on a linear scale extending along a direction in which the carriage moves, and the count value of the counter indicating the position of the carriage.

3. The apparatus according to claim 2, wherein the carriage moves with a belt and mounts one of a recording head for recoding an image and a reading head for reading an image.

4. The apparatus according to claim 1, wherein the signal generation unit is configured to generate a pattern of the signals of high or low according to the rotational phase.

5. The apparatus according to claim 1 wherein the control unit has a plurality of the data tables for a plurality of movement states of the carriage including an acceleration movement and a contract speed movement, and the control unit selects one of the tables according to the movement state.

6. The apparatus according to claim 1, wherein the DC motor is a three phase brushless motor and three Hall elements are provided therein.

* * * * *